United States Patent
Narducci et al.

(12)

(10) Patent No.: US 7,857,367 B2
(45) Date of Patent: Dec. 28, 2010

(54) FRONT FENDER FOR AN AUTOMOBILE

(75) Inventors: Angelo Narducci, Modigliana (IT);
Mauro Del Monte, Modena (IT);
Manuele Ghirelli, Mirandola (IT)

(73) Assignee: Ferrari S.p.A., Modena (IT)

( * ) Notice: Subject to any disclaimer, the term of this patent is extended or adjusted under 35 U.S.C. 154(b) by 0 days.

(21) Appl. No.: 12/308,711

(22) PCT Filed: Jun. 22, 2007

(86) PCT No.: PCT/IB2007/001706
§ 371 (c)(1),
(2), (4) Date: Apr. 10, 2009

(87) PCT Pub. No.: WO2007/148217
PCT Pub. Date: Dec. 27, 2007

(65) Prior Publication Data
US 2009/0236875 A1 Sep. 24, 2009

(30) Foreign Application Priority Data
Jun. 23, 2006 (IT) .................... BO2006A000487

(51) Int. Cl.
*B60R 19/26* (2006.01)
(52) U.S. Cl. .................... 293/155; 293/115; 296/193.1
(58) Field of Classification Search ............ 296/187.04, 296/187.09, 193.09, 193.1, 203.03; 293/132, 293/133, 120, 121, 115, 154, 155
See application file for complete search history.

(56) References Cited
U.S. PATENT DOCUMENTS
6,513,843 B1 * 2/2003 Frederick et al. ............... 293/36
6,672,652 B2 * 1/2004 Takeuchi et al. ....... 296/193.09

* cited by examiner

*Primary Examiner*—Joseph D Pape
(74) *Attorney, Agent, or Firm*—Davidson Berquist Jackson & Gowdey, LLP

(57) ABSTRACT

A front fender for an automobile; the fender is provided with an external element; with a supporting trestle, which supports the external element, presents a rigid horizontal supporting bar, and is adapted to be rigidly connected to a frame of the automobile; and with horizontal sword, which on one side is protrudingly mounted on the horizontal supporting bar and on the opposite side is rigidly secured to the external element at an upper portion of the external element itself.

20 Claims, 6 Drawing Sheets

FRONT FENDER FOR AN AUTOMOBILE

TECHNICAL FIELD

The present invention relates to a front fender for an automobile.

PRIOR ART

Recent European standards establish that the front part of an automobile must not transmit excessive stresses to the legs of a pedestrian in case of frontal collisions. In order to simulate the frontal collision against a pedestrian, European standards contemplate the use of a cylindrical impactor arranged vertically which is hurled at a speed of 40 km/h against the front part of an automobile; following such impact, sensors mounted on the impactor must not record stresses higher than the threshold values established by European standards.

In order to avoid transmitting excessive stresses to the legs of a pedestrian in case of frontal collision, the front fender must present an appropriate deformability. For such reason, it would be advisable to form the front fender of an automobile by molded plastic material of thermoplastic type (e.g. polypropylene). However, making a front fender which presents an overall length of 1.5-2 meters by thermoplastic plastic material molding requires the creation of a very complex and costly production system which requires a yearly production rate of at least several thousand of parts to be economically amortized.

For a more limited yearly production rate (e.g. fewer than 1000 parts per year), it is much more economically convenient to form a front fender by thermosetting plastic material, such as a fiberglass-filled resin using, for example, RTM (Resin Transfer Molding) technology; by way of example, in case of very limited production rates (less than 100 parts per year), the cost of a front fender formed by molded plastic material of the thermoplastic type is 2 to 3 times higher than the cost of a similar front fender formed by fiberglass-filled resin using RTM technology.

However, a front fender formed by fiberglass-filled resin is much stiffer than a similar front fender formed by plastic material of the thermoplastic type, because the fiberglass-filled resin is much stiffer than the plastic material of the thermoplastic type. Consequently, due to is high rigidity, a front fender formed by fiberglass-filled resin transmits very high stress to the legs of a pedestrian in case of frontal collision and thus may difficulty comply with the limits determined by the above-mentioned European standards.

DESCRIPTION OF THE INVENTION

It is the object of the present invention to provide a front fender for an automobile, which fender is free from the above-described drawbacks and is concurrently easy and cost-effective to manufacture.

According to the present invention, a front fender for an automobile as claimed in the appended claims is provided.

BRIEF DESCRIPTION OF THE DRAWINGS

The present invention will now be described with reference to the accompanying drawings which illustrate a non-limitative example of embodiment thereof, in which.

PREFERRED EMBODIMENTS OF THE INVENTION

Figure 1:
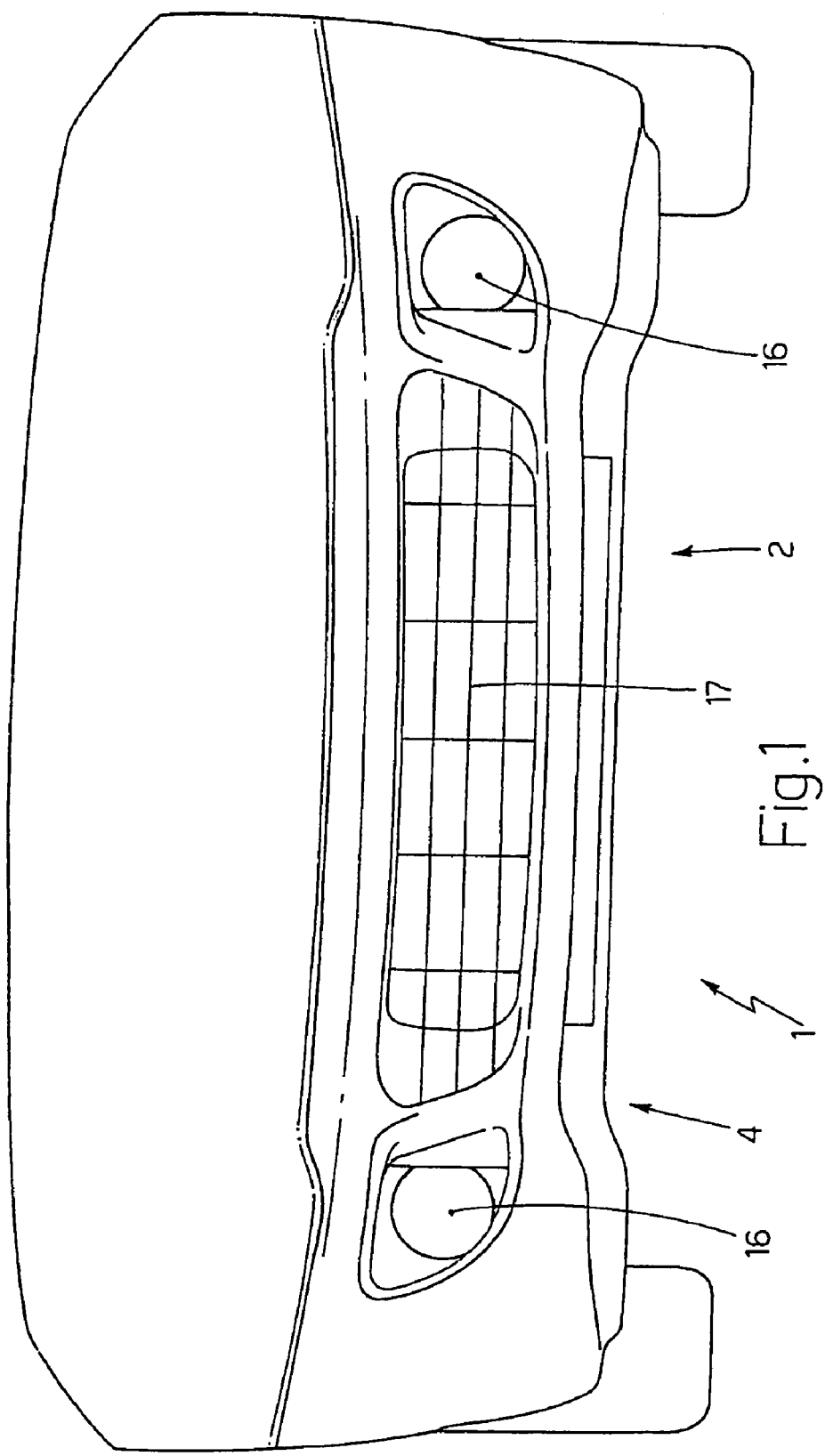
FIG. 1 diagrammatically shows a partial front view of an automobile provided with a front fender made according to the present invention.

In FIG. 1, numeral 1 indicates as a whole an automobile 1 provided with a front fender 2, which is carried by a frontal portion of a frame 3 (shown in FIG. 3) of automobile 1.

Fender 2 comprises an external element 4, which presents a "C"-shaped section and an enveloping shape so as to cover automobile 1 both frontally and laterally. External element 4 consists of a single thermosetting plastic material shell formed by fiberglass-filled resin using either RTM (Resin Transfer Molding) or SMC (Sheet Molding Compound) technology. Furthermore, fender 2 comprises a supporting trestle 5 (shown in FIG. 3), which supports external element 4 and is adapted to be rigidly connected to frame 3 of automobile 1.

Figure 3:
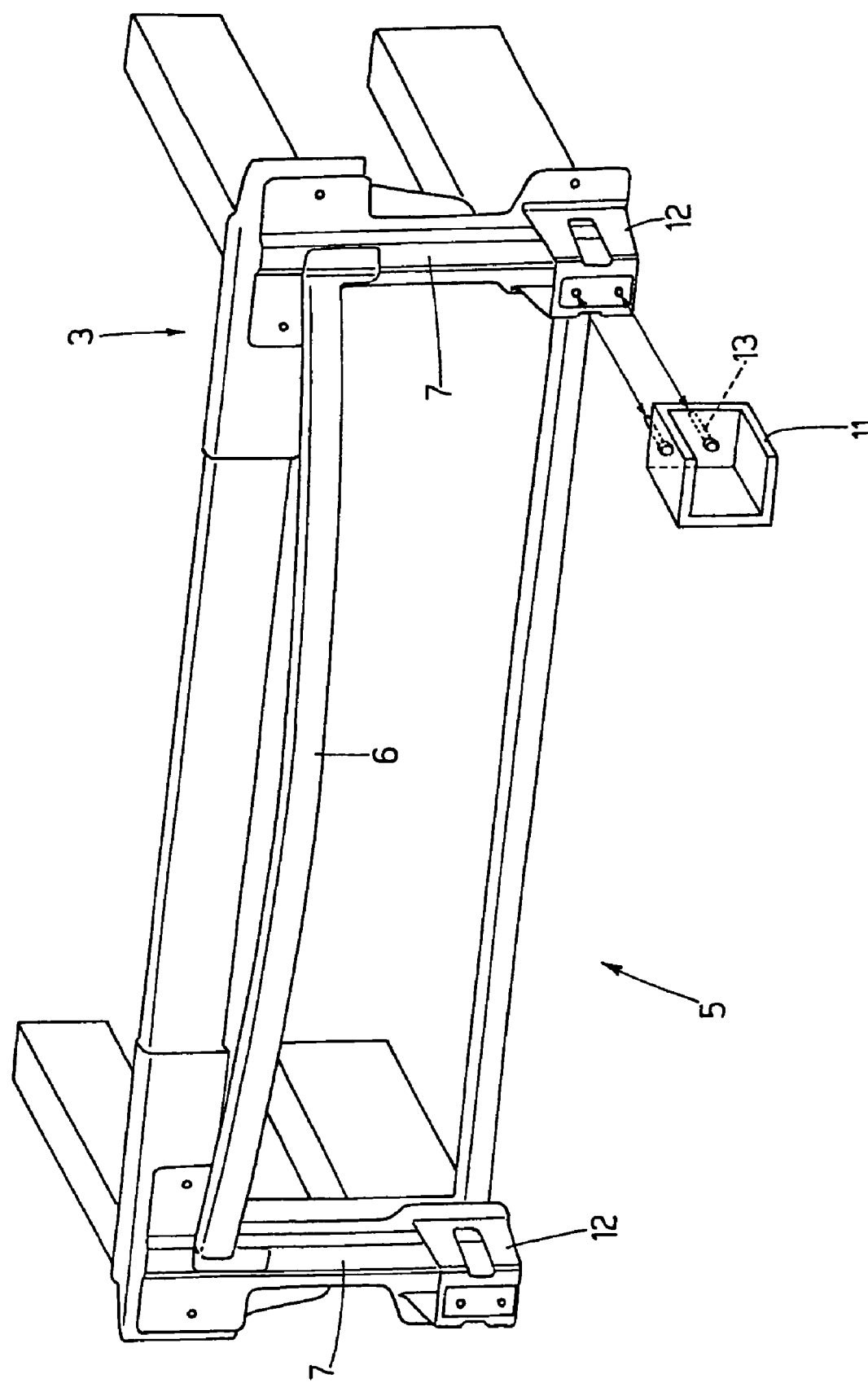
FIG. 3 diagrammatically shows a perspective view of a supporting trestle of the front fender in FIG. 1 with parts removed for clarity.

As shown in FIG. 3, supporting trestle 5 comprises a horizontal supporting bar 6 and a pair of vertical supporting brackets 7, which support horizontal supporting bar 6, are arranged on opposite sides of horizontal supporting bar 6 itself, and are adapted to be rigidly connected to frame 3 of automobile 1 by means of a plurality of screws (not shown).

Figure 4:
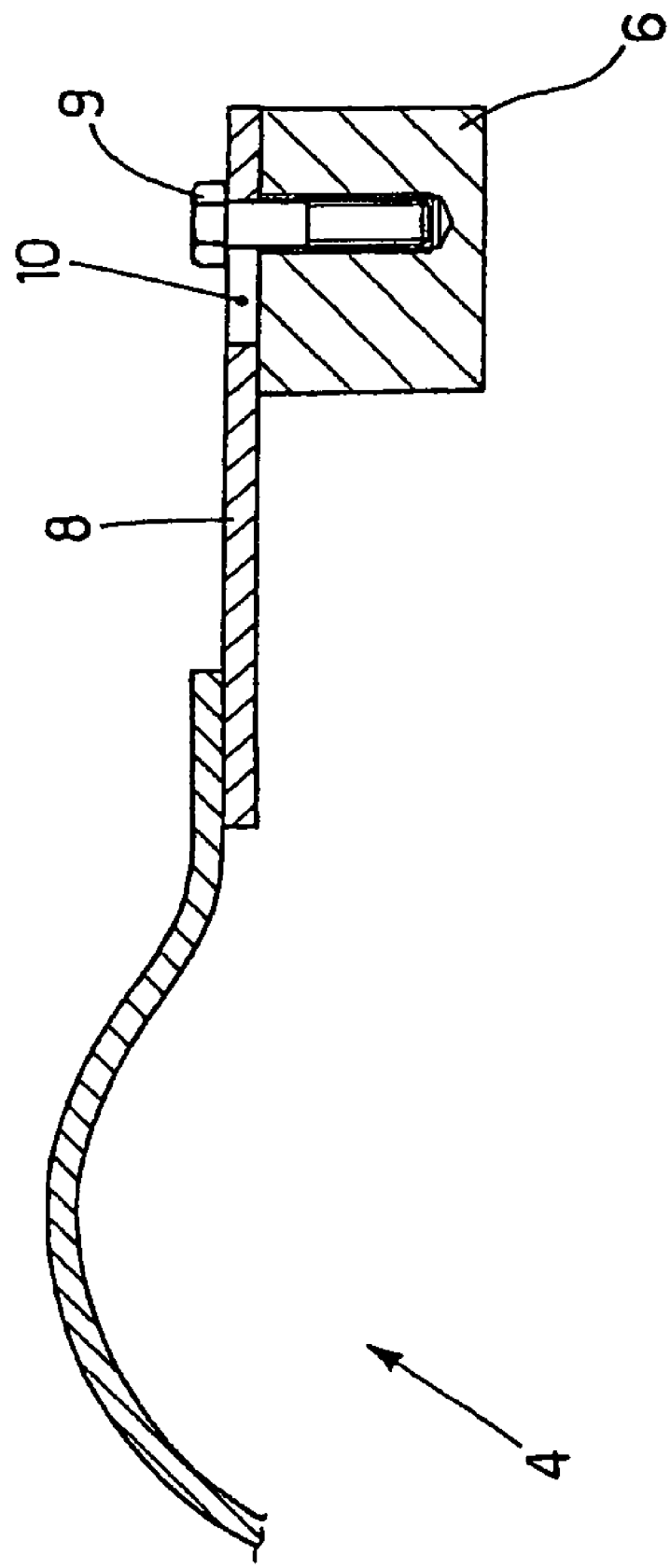
FIG. 4 diagrammatically shows a side section view of an external element of the front fender in FIG. 1 with parts removed for clarity.
Figure 5:
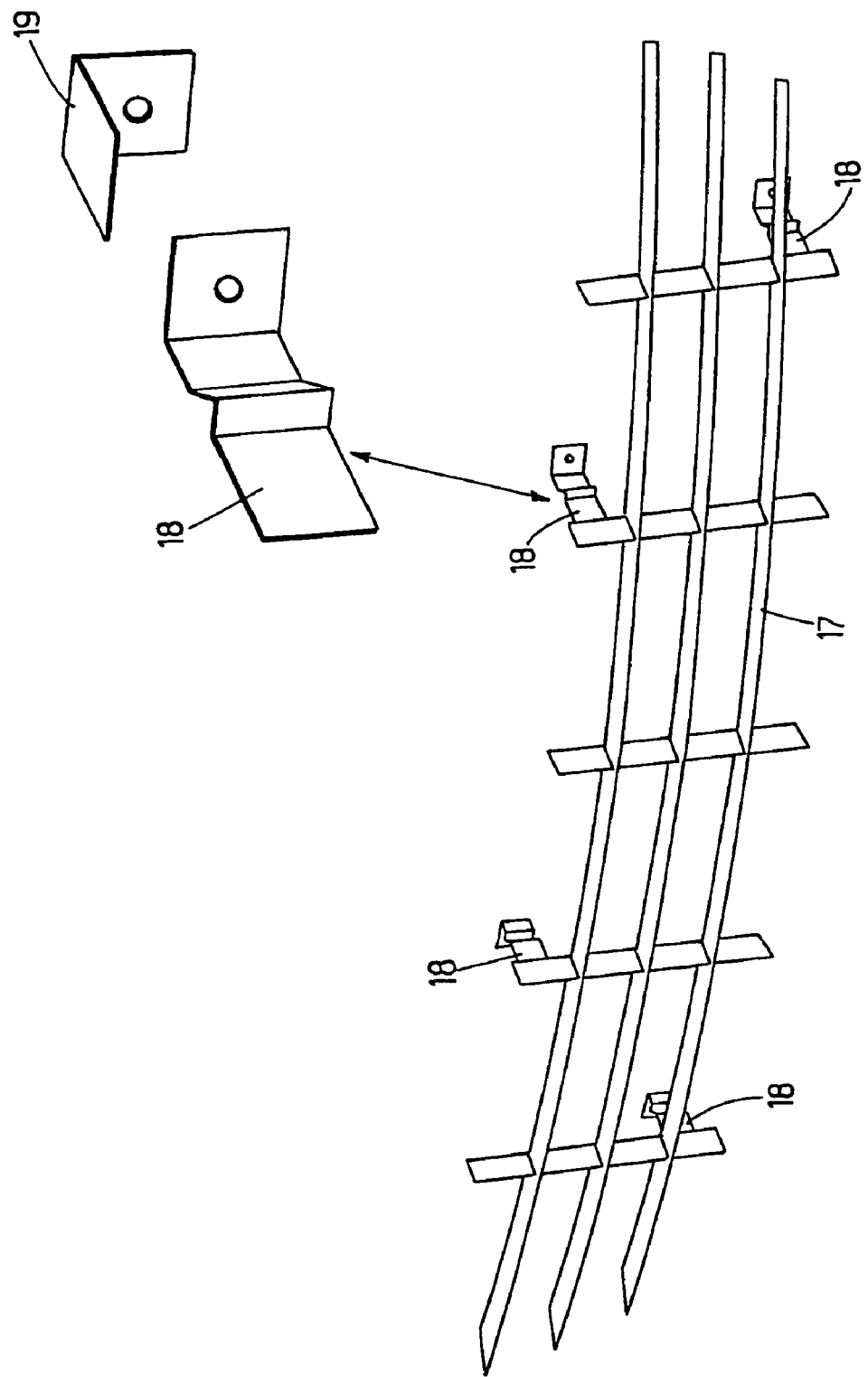
FIG. 5 diagrammatically shows a perspective view of a cowling carried by the front fender in FIG. 1 with parts removed for clarity.

As shown in FIG. 4, a horizontal sword 8 is contemplated, which sword is formed by plastic material of the thermoplastic type and on one side is protrudingly mounted on horizontal supporting bar 6 of supporting trestle 5 and on the opposite side is rigidly secured to external element 4 at an upper portion of external element 4 itself. Specifically, sword 8 is glued and/or riveted onto external element 4 and protrudingly mounted on horizontal supporting bar 6 by means of a plurality of screws 9, each of which is arranged through a through hole 10 obtained through sword 8 and is screwed onto horizontal supporting bar 6; each hole 10 presents a longitudinally elongated slot shape and each screw 9 is arranged at a rear end of hole 10 so as to allow a retraction of sword 8 with respect to horizontal supporting bar 6 in case of frontal collision.

Figure 2:
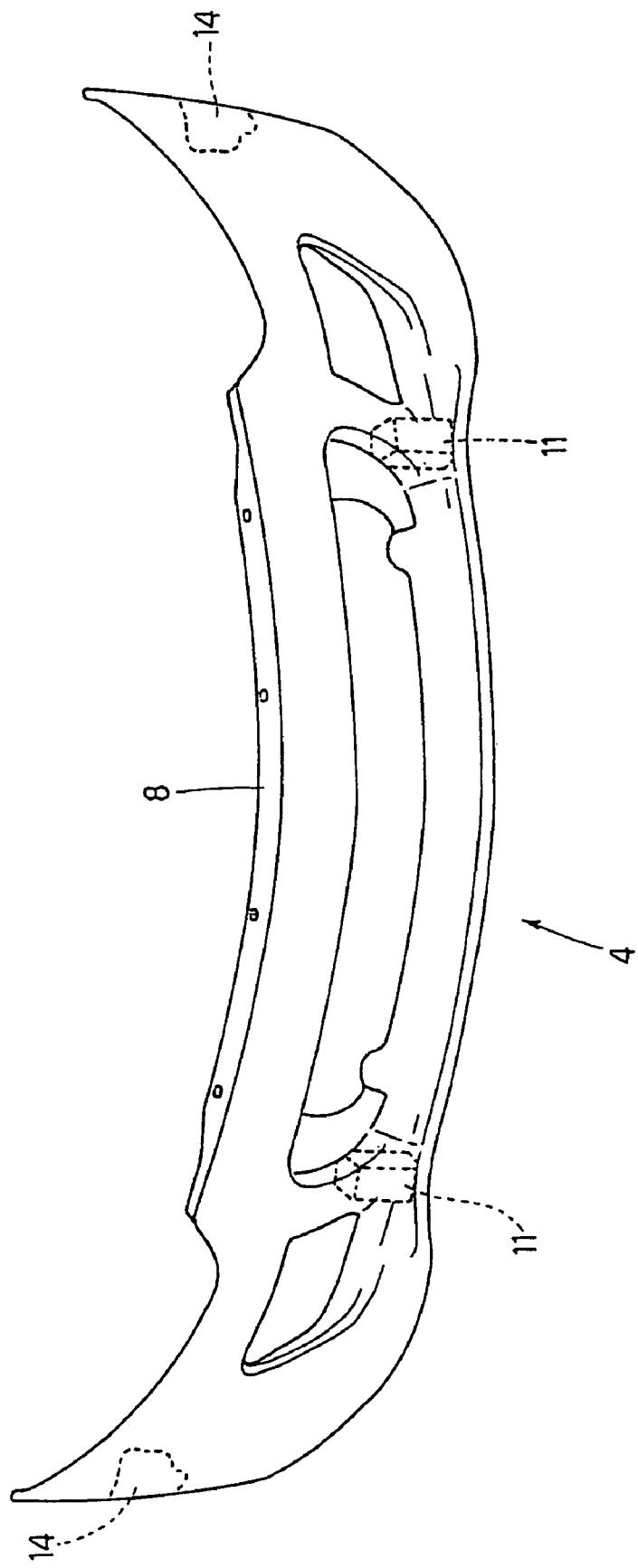
FIG. 2 diagrammatically shows a perspective top view of an external element of the front fender in FIG. 1 with parts removed for clarity.

Furthermore, as shown in FIGS. 2 and 3, a pair of rigid boxes 11, which are rigidly secured to external element 4 at a lower portion of external element 4, are arranged on opposite sides of external element 4 itself, and are mounted on vertical supporting brackets 7 of supporting trestle 5. Each box 11 is connected to vertical supporting bracket 7 of supporting trestle 5 by means of the interposition of a collapsible "U"-shaped bracket 12, which is welded to vertical supporting bracket 7; specifically, each box 11 is screwed onto collapsible bracket 12 by means of screws 13 embedded in box 11 itself. According to a preferred embodiment, boxes 11 are fracturable in case of collision.

As shown in FIG. 2, external element 4 is directly connectable to frame 3 of automobile 1 by means of a pair of side fasteners, which are arranged on the opposite sides of external element 4 itself. Each side fastening comprises a side body 14 glued to external element 4 is provided with screws (not shown) embedded in side body 14 itself and with an adjustable, rigid bracket (not shown) integral with frame 3 of automobile 1.

Figure 6:
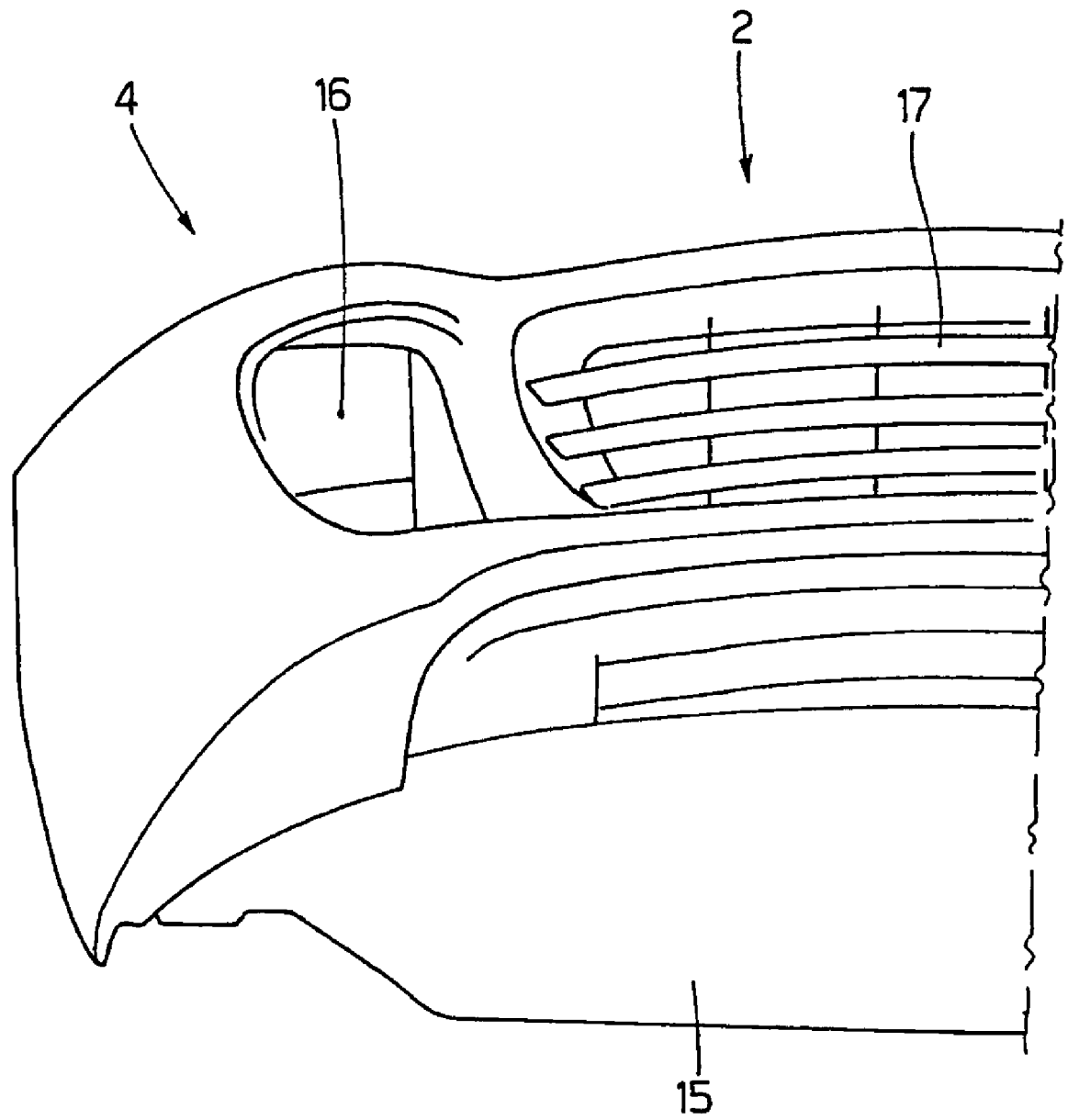
FIG. 6 diagrammatically shows a perspective bottom view of the front fender in FIG. 1 with parts removed for clarity.

As shown in FIG. 6, external element 4 is inferiorly couplable to an aerodynamic bottom 15 of automobile 1 in a sliding manner so as to allow a longitudinal sliding of external element 4 itself having a predetermined stroke. Specifically, external element 4 is inferiorly couplable to aerodynamic bottom 15 of automobile 1 by means of a plurality of screws (not shown), each of which is arranged in a through hole (not shown) presenting a longitudinally oriented elongated slot shape so as to allow a retraction of external element 4 in case of frontal collision.

As shown in FIG. 1, external element 4 is slidingly couplable to a number of air inlets 16 of automobile 1 to allow a longitudinal sliding of external element 4 itself having a predetermined stroke.

Finally, external element 4 supports a cowling 17 arranged in a central position and supported by means of a number of collapsible brackets 18, each of which is integral on one side with a portion of cowling 17 and on opposite side is screwed to an "L"-shaped bracket 19 rigidly connected (riveted and/or glued) to external element 4. Each collapsible bracket 18 presents a pre-weakened central portion, which is folded as a "V" to longitudinally give in case of collision.

External element 4 of above-described fender 2 is formed by fiberglass-filled resin and is thus particularly rigid; however, in virtue of the special interface between external element 4 and frame 3 of automobile 1, external element 4 is capable of giving in case of a front collision, thus limiting the stresses which are transmitting during the frontal collision itself. Consequently, above-described fender 2 transmits contained stress to the legs of a pedestrian in case of frontal collision and thus easily complies with the limits determined by European standards.

In this regard, it is important to underline that in case of frontal collision, external element 4 retracts longitudinally by effect of slot-shaped holes 10 and turns downwards by effect of the bending of sword 8.

The invention claimed is:

1. A front fender for an automobile comprising:
   an external element;
   a supporting structure which supports the external element comprising a rigid horizontal supporting bar rigidly connected to a frame of an automobile; and
   a horizontal flange mounted at one end to the horizontal supporting bar with an opposite end being rigidly secured to an upper portion of the external element.

2. The fender according to claim 1, wherein the horizontal flange is protrudingly mounted on the horizontal supporting bar by means of a plurality of first screws, each of which is arranged in a first through hole provided in the horizontal flange; each first hole comprising a longitudinally elongated slot shape and each first screw is arranged at a rear end of the first hole to allow a retraction of the horizontal flange relative to the horizontal supporting bar in case of frontal collisions.

3. The fender according to claim 1, wherein the horizontal flange is glued and/or riveted to the external element.

4. The fender according to claim 1, wherein the horizontal flange is formed by thermoplastic material.

5. The fender according to claim 1, wherein the supporting structure comprises a pair of vertical supporting brackets, which support the horizontal supporting bar, are arranged on opposite sides of the horizontal supporting bar, and are adapted to be rigidly connected to the automobile frame.

6. The fender according to claim 5 further comprising a pair of rigid boxes, which are rigidly secured to the external element at a lower portion of the external element and arranged on opposite sides of the external element, each rigid box being respectively mounted on respective ones of the pair of vertical supporting brackets of the supporting structure.

7. The fender according to claim 6, wherein the pair of rigid boxes are fracturable in case of frontal collision.

8. The fender according to claim 6, wherein each rigid box is connected to the vertical supporting bracket of the supporting structure by the interposition of a "U"-shaped collapsible bracket.

9. The fender according to claim 8, wherein each rigid box is screwed onto the collapsible bracket by means of second screws embedded in the rigid box.

10. The fender according to claim 1, wherein the external element is directly connectable to the automobile frame by a pair of side fasteners arranged on opposite sides of the external element.

11. The fender according to claim 1, wherein the external element is slidably attached to an aerodynamic bottom of the automobile in a sliding manner so as to allow a longitudinal sliding of the external element relative to the bottom of the automobile.

12. The A fender according to claim 11, wherein the external element is slidably attached by a plurality of screws, each of which is arranged in a through hole presenting a longitudinally oriented slot shape so as to allow movement in case of frontal collision.

13. The fender according to claim 1, wherein the external element is attached to a number of air inlets of the automobile to allow a longitudinal sliding of the external element relative to the automobile.

14. The fender according to claim 1 further comprising a cowling which is arranged in a central position and is supported by the external element.

15. The fender according to claim 14, wherein the cowling is supported by the external element through a plurality of collapsible brackets, each of which is on one side integral with a portion of the cowling and on an opposite side is fastened to an "L"-shaped bracket connected to the external element.

16. The fender according to claim 15, wherein each "L"-shaped bracket is glued and/or riveted to the external element.

17. The fender according to claim 15, wherein each collapsible bracket presents a pre-weakened central portion, which is folded as a "V" to longitudinally collapse in case of collision.

18. The fender according to claim 1, wherein the external element includes a thermosetting plastic shell.

19. The fender according to claim 1, wherein the external element comprises a fiberglass-filled plastic resin and is formed using RTM (Resin Transfer Molding) technology.

20. The fender (2) according to claim 1, wherein the external element comprises a fiberglass-filled plastic resin and is formed using SMC (Sheet Molding Compound) technology.

* * * * *